United States Patent
Gava et al.

(10) Patent No.: US 11,210,076 B2
(45) Date of Patent: *Dec. 28, 2021

(54) DOWNLOADING AND LAUNCHING AN APP ON A SECOND DEVICE FROM A FIRST DEVICE

(71) Applicant: Samsung Electronics Co., Ltd., Suwon (KR)

(72) Inventors: Fabio Gava, Ladera Ranch, CA (US); Fei Xie, Irvine, CA (US); Nan Yang, Newport Beach, CA (US); Shiangfeng Lee, Irvine, CA (US); Murugan Viswanathan, Irvington, TX (US); Andrew Shelansky, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/751,821

(22) Filed: Jan. 28, 2013

(65) Prior Publication Data

US 2014/0215457 A1 Jul. 31, 2014

(51) Int. Cl.
*G06F 8/61* (2018.01)
*H04L 29/08* (2006.01)

(52) U.S. Cl.
CPC ............ *G06F 8/61* (2013.01); *H04L 67/1095* (2013.01)

(58) Field of Classification Search
CPC .. G06F 7/78; G06F 8/00–78; G06F 9/44–455; G06F 11/36

(Continued)

(56) References Cited

U.S. PATENT DOCUMENTS 6,567,984 B1 5/2003 Allport
6,809,830 B1 10/2004 Lafky
(Continued)

FOREIGN PATENT DOCUMENTS

KR 1020050122612 A 12/2005
KR 20100017023 A 2/2010
(Continued)

OTHER PUBLICATIONS

Wikipeida, "Splash Screen", http://en.wikipedia.org/wiki/Splash_screen, Internet Archive Jun. 22, 2012 (Year: 2012).*

(Continued)

*Primary Examiner* — Doon Y Chow
*Assistant Examiner* — Timothy P Duncan
(74) *Attorney, Agent, or Firm* — Sherman IP LLP; Kenneth L. Sherman; Hemavathy Perumal (57) ABSTRACT

The user experience of application downloading and usage between multiple devices in a network is enhanced. One instance of an app on a first device is able to identify and verify installation and/or execution of a companion app on a second device where the two devices may have entirely different platforms (e.g., smartphone operating system and TV platform). The experience for users who have devices on the same network converge in order to improve the user experience with respect to a particular app. In this manner, an enhanced and efficient means of providing an n-screen experience with the app is enabled; ways that provide synergy between devices on the same network.

23 Claims, 5 Drawing Sheets

(58) Field of Classification Search
USPC .................................................. 717/100–178
See application file for complete search history.

(56) References Cited

U.S. PATENT DOCUMENTS

| | | | |
|---|---|---|---|
| 7,136,874 B2 | 11/2006 | Mercer | |
| 7,143,353 B2 | 11/2006 | Thomas | |
| 7,309,287 B2 | 12/2007 | Miyamoto et al. | |
| 7,356,357 B2* | 4/2008 | DeCost | G06Q 20/327 |
| | | | 455/566 |
| 7,398,474 B2 | 7/2008 | Yan | |
| 7,716,700 B2 | 5/2010 | Carlucci | |
| 7,948,476 B2 | 5/2011 | Goto | |
| 7,949,680 B2 | 5/2011 | Yanagita et al. | |
| 7,987,491 B2 | 7/2011 | Reisman et al. | |
| 8,331,772 B1 | 12/2012 | Zdepski | |
| 8,421,808 B2 | 4/2013 | Ishii et al. | |
| 8,589,909 B2 | 11/2013 | Hu | |
| 8,589,986 B2 | 11/2013 | McCoy | |
| 8,726,189 B2 | 5/2014 | Weber et al. | |
| 8,875,212 B2 | 10/2014 | Rakib | |
| 8,937,534 B2 | 1/2015 | Kreiner et al. | |
| 8,943,409 B2 | 1/2015 | Bryant-Rich | |
| 8,990,703 B2 | 3/2015 | Nhiayi | |
| 9,252,950 B2 | 2/2016 | Caspi | |
| 9,264,753 B2 | 2/2016 | Xu | |
| 2003/0221100 A1* | 11/2003 | Russ | H04N 21/8586 |
| | | | 713/153 |
| 2007/0094322 A1 | 4/2007 | Peev et al. | |
| 2007/0171201 A1 | 7/2007 | Pi | |
| 2007/0174424 A1* | 7/2007 | Chen | G06F 9/44526 |
| | | | 709/217 |
| 2007/0178891 A1* | 8/2007 | Louch | H04M 11/007 |
| | | | 455/420 |
| 2007/0201833 A1 | 8/2007 | Cherna | |
| 2008/0028389 A1* | 1/2008 | Genty et al. | 717/174 |
| 2009/0111453 A1* | 4/2009 | Hsu | G06F 8/61 |
| | | | 455/419 |
| 2009/0168090 A1 | 7/2009 | Nakano et al. | |
| 2009/0249429 A1 | 10/2009 | Sullivan | |
| 2009/0260001 A1* | 10/2009 | Park et al. | 717/173 |
| 2010/0023852 A1 | 1/2010 | Chou | |
| 2010/0046009 A1* | 2/2010 | Pandit et al. | 358/1.1 |
| 2010/0060572 A1 | 3/2010 | Tsern et al. | |
| 2010/0097650 A1* | 4/2010 | Seo | 358/1.15 |
| 2010/0192206 A1 | 7/2010 | Aoyama | |
| 2010/0197220 A1 | 8/2010 | Zilliacus | |
| 2010/0262673 A1 | 10/2010 | Chang et al. | |
| 2010/0277365 A1 | 11/2010 | Ha et al. | |
| 2011/0083069 A1 | 4/2011 | Paul et al. | |
| 2011/0099157 A1 | 4/2011 | Lebeau et al. | |
| 2011/0214121 A1* | 9/2011 | Gentile | H04L 43/065 |
| | | | 717/177 |
| 2011/0289493 A1* | 11/2011 | Keefe | G06F 8/65 |
| | | | 717/168 |
| 2012/0002111 A1* | 1/2012 | Sandoval | H04N 5/06 |
| | | | 348/521 |
| 2012/0008910 A1 | 1/2012 | Tamura et al. | |
| 2012/0050183 A1 | 3/2012 | Lee et al. | |
| 2012/0054616 A1* | 3/2012 | Mittal | G06F 17/30899 |
| | | | 715/722 |
| 2012/0054735 A1* | 3/2012 | Tseng | G06F 8/61 |
| | | | 717/171 |
| 2012/0066715 A1 | 3/2012 | Jain et al. | |
| 2012/0151530 A1 | 6/2012 | Krieger | |
| 2012/0220355 A1* | 8/2012 | Haltovsky | G06F 3/0416 |
| | | | 463/16 |
| 2012/0290669 A1* | 11/2012 | Parks | H04W 4/008 |
| | | | 709/206 |
| 2013/0042233 A1* | 2/2013 | Kinsella | G06F 8/61 |
| | | | 717/177 |
| 2013/0064187 A1* | 3/2013 | Patil | H04W 76/021 |
| | | | 370/329 |
| 2013/0094591 A1 | 4/2013 | Laksono | |
| 2013/0108239 A1 | 5/2013 | Ryer | |
| 2013/0132605 A1 | 5/2013 | Kocks et al. | |
| 2014/0006474 A1* | 1/2014 | White | H04N 5/44543 |
| | | | 709/201 |
| 2014/0010121 A1 | 1/2014 | Patil et al. | |
| 2014/0082610 A1* | 3/2014 | Wang | G06F 9/445 |
| | | | 717/178 |
| 2014/0089414 A1 | 3/2014 | Patil et al. | |
| 2014/0099973 A1 | 4/2014 | Cecchini et al. | |
| 2014/0108623 A1* | 4/2014 | Gunderson | H04N 21/4126 |
| | | | 709/220 |
| 2014/0139742 A1* | 5/2014 | Krishna | H04N 21/4316 |
| | | | 348/565 |
| 2014/0165112 A1 | 6/2014 | Freeman et al. | |
| 2014/0170978 A1* | 6/2014 | Wolman et al. | 455/41.2 |
| 2015/0022619 A1* | 1/2015 | Aleixo Dinis Lopes | |
| | | | H04N 21/6137 |
| | | | 348/14.02 |
| 2015/0063779 A1 | 3/2015 | Fahn et al. | |
| 2015/0067508 A1 | 3/2015 | Fahn et al. | |
| 2020/0097272 A1 | 3/2020 | Gava et al. | |

FOREIGN PATENT DOCUMENTS

| | | |
|---|---|---|
| KR | 10-2011-0093844 A | 8/2011 |
| KR | 20120094231 A | 8/2012 |
| KR | 20120122164 A | 11/2012 |
| WO | 2009151635 A1 | 12/2009 |

OTHER PUBLICATIONS

Bonamy, "Do not ask again" Message Boxes, https://www.codeporject.com/Articles/3624/quot-Do-not-ask-again-quot-Message-Boxes, accessed on Nov. 9, 2020 (Year: 2003).*

Park, M. et al., "A perceptive remote-control 3D TV interface", The International Society for Optical Engineering, Apr. 13, 2007, pp. 1-2, SPIE Newsroom, United States.

Bove Jr., V.M. et al., "Hyperlinked television research at the MIT Media Laboratory" IBM Systems Journal, Jul. 2000, pp. 470-478, vol. 39, Nos. 3&4, IBM, United States.

European Search Report dated Mar. 14, 2014 for European Patent Application No. 14150416.7 from European Patent Office, pp. 1-8, Munich Germany.

Wikipedia, "Secure Shell-SSH", Jan. 26, 2013, pp. 1-9, Wikipedia. org, United States (downloaded on Jul. 30, 2014).

International Search Report and Written Opinion dated Mar. 31, 2014 for International Application No. PCT/KR2013/011498 from Korean Intellectual Property Office, pp. 1-8, Daejeon, Republic of Korea.

U.S. Non-Final Office Action for U.S. Appl. No. 14/023,215 dated Jan. 16, 2015.

U.S. Final Office Action for U.S. Appl. No. 14/023,215 dated Aug. 3, 2015.

U.S. Advisory Action for U.S. Appl. No. 14/023,215 dated Oct. 22, 2015.

U.S. Non-Final Office Action for U.S. Appl. No. 14/190,026 dated Sep. 30, 2015.

U.S. Final Office Action for U.S. Appl. No. 14/191,943 dated Jun. 17, 2016.

U.S. Advisory Action for U.S. Appl. No. 14/190,026 dated May 19, 2016.

U.S. Non-Final Office Action for U.S. Appl. No. 14/023,215 dated Apr. 6, 2016.

U.S. Final Office Action for U.S. Appl. No. 14/190,026 dated Feb. 10, 2016.

U.S. Non-Final Office Action for U.S. Appl. No. 14/191,943 dated Feb. 16, 2016.

U.S. Final Office Action for U.S. Appl. No. 14/023,215 dated Sep. 23, 2016.

U.S. Advisory Action for U.S. Appl. No. 14/191,943 dated Oct. 4, 2016.

U.S. Advisory Action for U.S. Appl. No. 14/023,215 dated Jan. 12, 2017.

(56) References Cited

OTHER PUBLICATIONS

U.S. Non-Final Action for U.S. Appl. No. 14/191,943 dated Jan. 11, 2017.
U.S. Final Office Action for U.S. Appl. No. 14/191,943 dated Jun. 30, 2017.
U.S. Non-Final Office Action for U.S. Appl. No. 14/023,215 dated Feb. 23, 2017.
U.S. Final Office Action for U.S. Appl. No. 14/023,215 dated Aug. 30, 2017.
U.S. Non-Final Office Action for U.S. Appl. No. 14/190,026 dated Sep. 12, 2017.
U.S. Notice of Allowance for U.S. Appl. No. 14/191,943 dated Oct. 10, 2017.
European Examination Report dated Nov. 9, 2017 for European Application No. 14150416.7 from European Patent Office Action, pp. 1-5, Munich, Germany.
U.S. Advisory Action for U.S. Appl. No. 14/023,215 dated Dec. 13, 2017.
U.S. Final Office Action for U.S. Appl. No. 14/190,026 dated Jan. 19, 2018.
U.S. Notice of Allowance for U.S. Appl. No. 14/190,026 dated Oct. 24, 2018.
Korean Office Action dated Jul. 17, 2019 for Korean Application No. 10-2013-0168267 from Korean Patent Office Action, pp. 1-15, Seoul, South Korea (English-language translation included pp. 1-10).
Korean Notice of Allowance dated Mar. 18, 2020 for Korean Application No. 10-2020-020275745 from Korean Patent Office Action, pp. 1-9, Seoul, South Korea (English-language translation included pp. 1-2).
U.S. Final Office Action for U.S. Appl. No. 16/696,829 dated Nov. 24, 2020.
Supplementary European Search Report dated Nov. 11, 2020 for European Patent Application No. 20184977.5 from European Patent Office, pp. 1-4, Munich Germany.
Summons to attend oral proceedings pursuant to Rule 115(1) EPC dated Nov. 20, 2020 for European Patent Application No. 14150416.7 from European Patent Office, pp. 1-8, Munich Germany.
European Examination Report dated Nov. 24, 2020 for European Application No. 20184977.5 from European Patent Office Action, pp. 1-6, Munich, Germany.
Result of Consulation dated Nov. 2, 2020 for European Application No. 14150416.7 from European Patent Office Action, pp. 1-4, Munich, Germany.
Netflix, "DIAL: Discovery and Launch protocal specification, Version 1.6.4", Dec. 19, 2012, p. 1-16, Retreived from the Internet: https://community.arubanetworks.com/HigherLogic/System/DownloadDocumentFile.ashx? DocumentFileKey=84dcfb59-f256-4ebd-a10f-e0a9a1f9f9ef.
U.S. Non-Final Office Action for U.S. Appl. No. 16/696,829 dated Aug. 6, 2020.
U.S. Notice of Allowance for U.S. Appl. No. 16/696,829 dated Mar. 17, 2021.
U.S. Advisory Action for U.S. Appl. No. 16/696,829 dated Mar. 3, 2021.
European Examination Report dated May 3, 2021 for European Application No. 20184977.5 from European Patent Office Action, pp. 1-4, Munich, Germany.
U.S. Corrected Notice of Allowability for U.S. Appl. No. 16/696,829 dated Jun. 8, 2021.
U.S. Corrected Notice of Allowability for U.S. Appl. No. 16/696,829 dated Jun. 23, 2021.

\* cited by examiner

DOWNLOADING AND LAUNCHING AN APP ON A SECOND DEVICE FROM A FIRST DEVICE

TECHNICAL FIELD

An embodiment of the present invention relates generally to software for computing devices and convergence networking of such devices. More specifically, it relates to enabling downloading and executing of software applications on various user devices in the same network.

BACKGROUND

Applications that run on non-traditional computing devices, commonly referred to as "apps," are now quite widespread and known to many users mostly due to their increasingly prevalent use of smartphones, tablets, and other mobile devices. Apps are presently available on a wide range of platforms, including TVs and PCs. Smartphone users frequently download, install and use apps onto their devices. This practice is becoming increasingly popular as well with tablets. Apps are one of the drivers making these mobile devices more and more popular. Finding an app in an app marketplace or app store and then downloading it onto a mobile device is a straightforward procedure and has now become second-hand nature for a lot of users, particularly younger ones.

However, downloading an app onto a TV has not yet caught on among the general public. People do not generally think of executing an app on their TV, even if they have an app on their smartphone and a companion or compatible app is available. Users simply are not aware that there is a similar app available for download on their TV. Or, the user has already downloaded a similar or companion app on their TV but is unaware that the two apps (e.g., on the phone and TV) executing together can provide an enhanced user experience. In instances where a user thinks about executing an app on a TV, she does it by using a remote control and downloads and executes it directly on the TV.

Convergence among various devices is becoming more popular, especially among devices on a home network that has a TV. Convergence features provide the capability of devices to communicate and, consequently, new mechanisms for deploying apps on other devices within a convergence network would be desirable. There is an increasing desire to have devices on a local network communicate with each other and share information. For example, with apps, there is often a companion app that executes on a compatible device having an entirely different platform. To illustrate, there may be a Hulu app for the TV and for a smartphone, but the user only has the one on her smartphone. However, her experience with Hulu would be better if she could execute the Hulu app for the TV as well. As such, it would be desirable to have two or more companion apps work together with minimal user input to deliver an enhanced user experience for the apps.

SUMMARY

One aspect of the invention is a method of using a device to execute an app on another (second) device, for example, using a smartphone having a particular app to execute a companion app on a TV. The two devices will typically be in two different classes, that is, have different operating systems, platforms, and the like, but this is not required (e.g., each device can be a smartphone, tablet, or TV). The second device is queried by the first device to determine whether there is a compatible or companion app already installed on the second device. If there is, it is then determined whether the companion app is presently running on the second device. If it is not, then a message is displayed on the first device asking whether the user of the first device wants to execute the companion app on the second device. If the user of the first device consents, the companion app is executed on the second device. In one embodiment, there may be a message displayed on the second device stating that another user is causing the execution of an app on the second device. For example, a person watching TV will see a message that another user, via her smartphone, is causing the execution of a companion app on the TV. The program or show that the person is watching on TV will not be interrupted.

Another aspect of the invention is a method of using a first device to execute an app on a second device. The first device queries the second device for a compatible app to see if it is already installed. The user of the first device is prompted as to whether to install the compatible app on the second device. It is then determined whether to install the compatible app on the second device. A request is transmitted to the second device to install the compatible app. The compatible app is then downloaded onto the second device.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Applications are currently available on a wide range of platforms and devices, including smartphones, tablet devices, mobile gaming devices, computing devices in cars, PCs, and TVs. Users are accustomed to the app download, installation, and usage experience on their handheld and mobile devices, the vast majority of which are smartphones and tablets. Now that convergence features enable communication between all these devices and platforms on a local/home network, new mechanisms described in the various embodiments of the present invention deploy apps among various devices in the convergence network. One example of convergence is allowing the user to launch an app on a TV using a smartphone. The overall goal is that when devices are on the same network, it would be desirable to have synergy among the devices.

Methods and systems for enhancing the user experience of application downloading and usage between multiple devices in a network are described in the various figures. One or more embodiments describe the ability of one instance of an app on a first device to identify and verify installation and/or execution of a companion app on a second compatible device where the two devices may have entirely different platforms (e.g., smartphone operating system and TV platform). The term platform may refer to the application runtime environment provided by the TV. It may be described as a layer above the TV operating system that provides both a runtime environment for generic programming instructions as well as the APIs to interface with specific TV functions, services or devices. In the TV application platform, programmers have a choice of programming, for example, in JavaScript or Flash. There are also APIs to interface with the TV tuner, infra-red remote, WiFi/Ethernet/Bluetooth adapters, cameras, and the like.

One or more embodiments of the present invention deliver more than a mere "split screen" user experience or simple sharing of an app on the devices where one app is executing on a smartphone and another related app is executing on a TV. One or more embodiments describe ways in which the experience for users having their devices on the same network converge in order to improve the user experience with respect to a particular app. In this manner, they deliver an enhanced and efficient means of providing an n-screen experience with the app; ways that provide synergy between devices on the same network.

Figure 1:
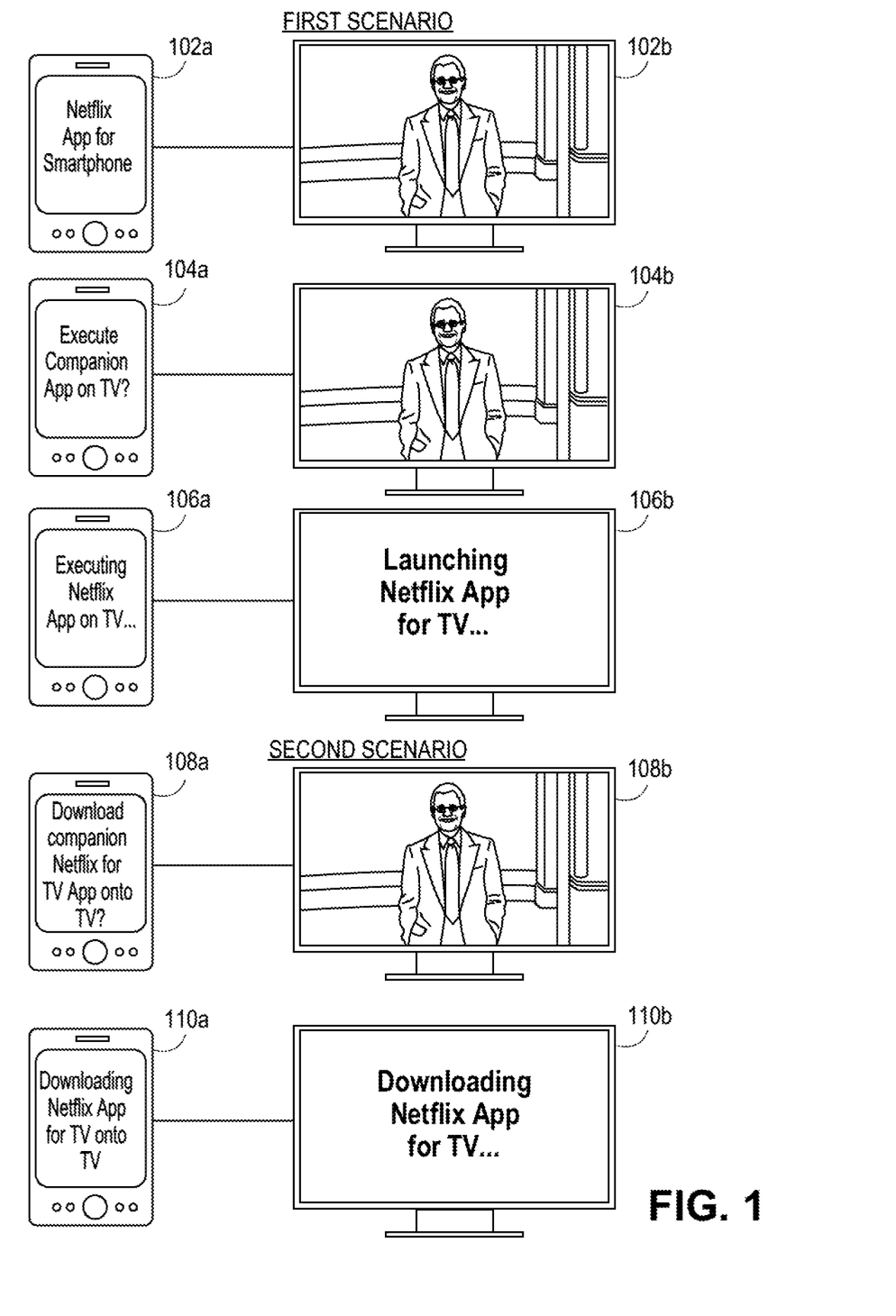
FIG. 1 is an illustration of a series of displays on two devices connected in a local/home network in accordance with one embodiment.

FIG. 1 is an illustration of a series of displays on two devices connected in a local/home network in accordance with one embodiment. For illustrative purposes, the two devices are a smartphone and a TV. In a first scenario, a smartphone display 102a shows a Netflix app which the user is browsing. The device is connected to a home network and is in communication with a TV displaying a TV show 102b. The smartphone discovers that the TV has a companion Netflix app and asks the user if he wants to execute the Netflix companion app on the TV in display 104a. During this time the TV still displays the TV show 104b. If the smartphone user gives permission to execute the companion Netflix TV app on the TV, in one embodiment a message as shown in 106b is displayed on the TV ("Launching Netflix App for TV . . . " or something similar). Additional information such as the name of the user who gave permission to launch the app may be displayed or the message may be displayed in a side bar or smaller display area while the TV show continues to be displayed.

In a second scenario, the companion app may not be on the second device but one is available from an app download server or other source on the network. In this case, a display such as one shown in 108a where the user is asked whether he wants to initiate a download of a companion "Netflix for TV" app onto the TV. During this time, the TV continues to display a TV show or other image as shown in 108b. If the user gives permission to download the companion app, a display such as 110a on the smartphone indicating that the Netflix for TV app is being downloaded is shown. The TV may display a message such as shown in 110b ("Downloading Netflix App for TV . . . ") or a similar message. At download completion the companion app will execute automatically. In an alternative embodiment the TV could prompt the user again for confirmation. As these display images show, most of the processes take place in the background, beginning with discovery of the second device to the launching or downloading of the companion app. The only interaction with the user is seeking permission to perform the launching or downloading activity. In another embodiment, these activities may be done automatically without confirmation from the user. This may be preferable for users who always want to have companion apps downloaded or executed on one or more additional devices on the network. In this scenario, the user will automatically have a convergence experience (multi-screen experience) with the app on his devices.

Figure 2A:
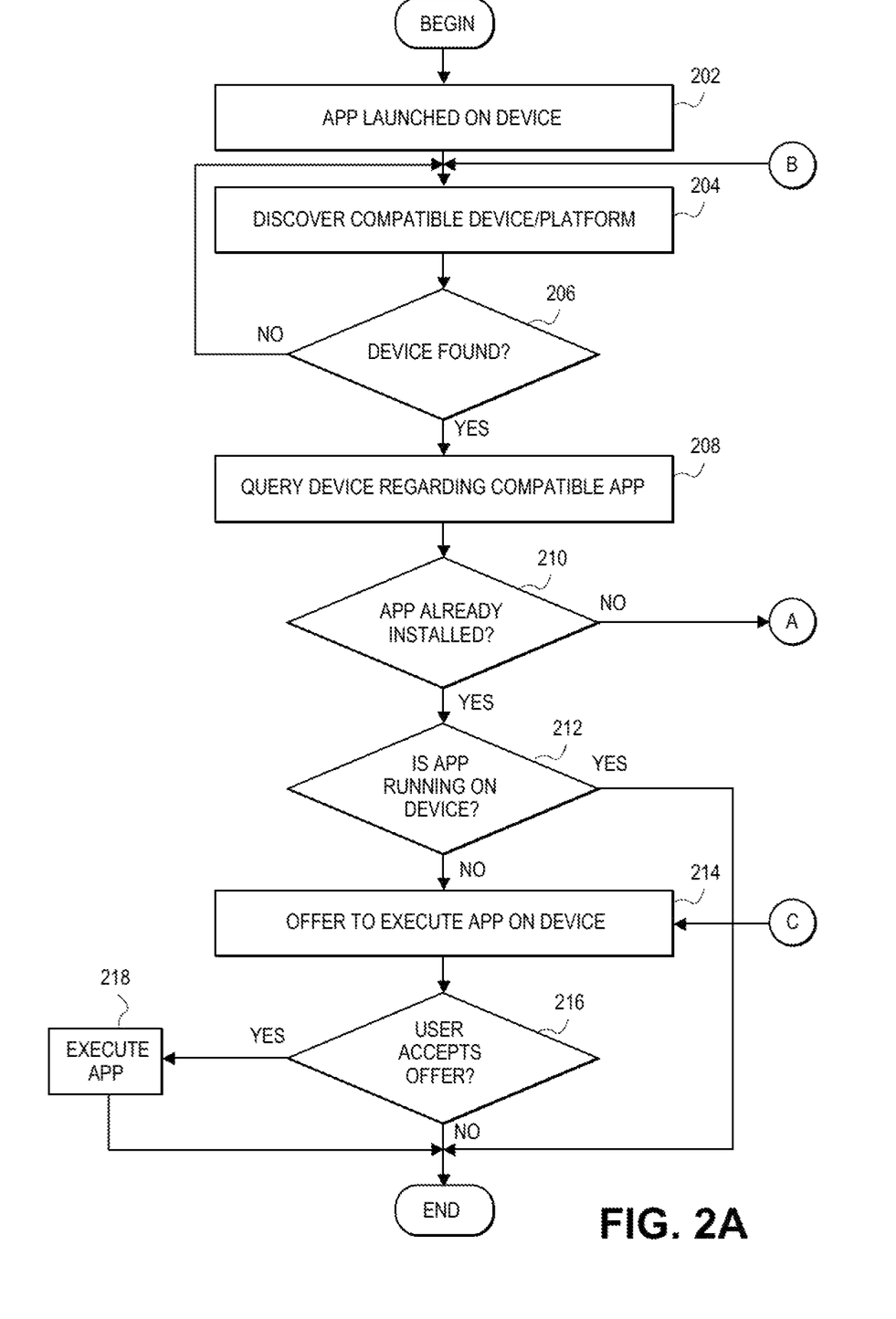
FIGS. 2A and 2B are flow diagrams of processes for discovering, executing, and downloading a companion app on a second device in accordance with one embodiment of the present invention.
Figure 2B:
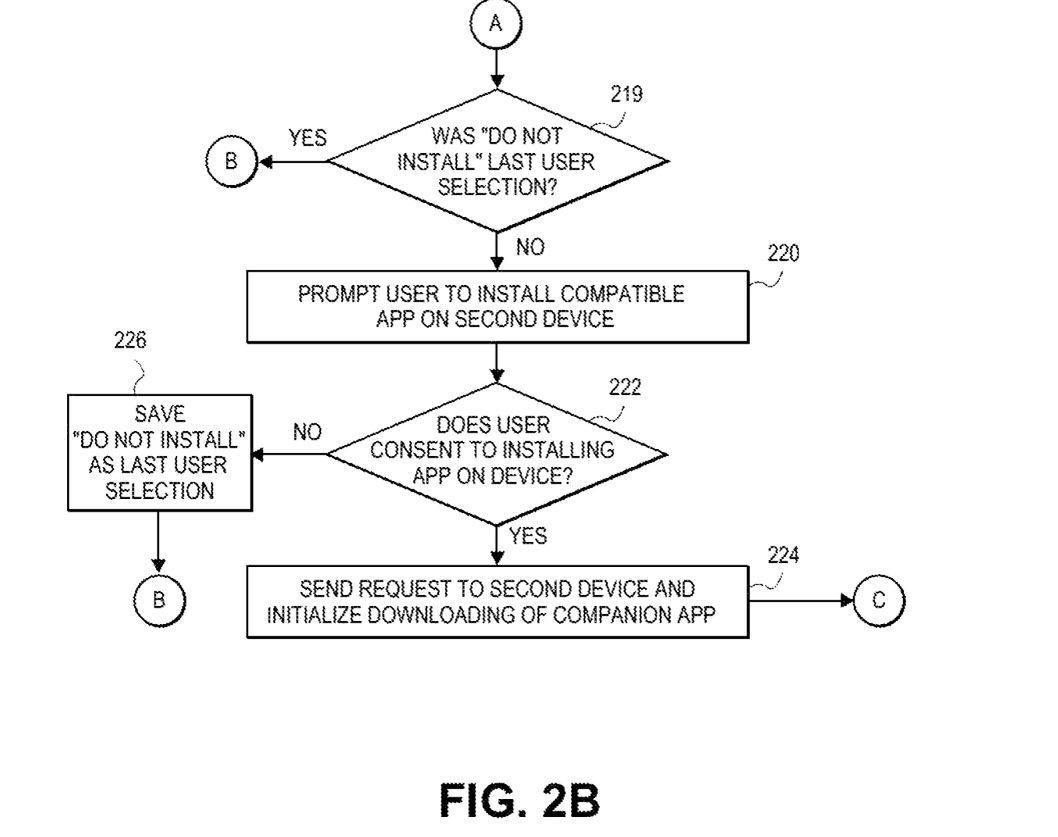

FIGS. 2A and 2B are flow diagrams of processes for discovering, executing, and downloading a companion app on a second device in accordance with one embodiment of the present invention. At block 202, a user launches an app on a device which has a particular platform and is using the app when the process starts. For ease of explanation, this app is sometimes referred to as the "primary app" (and sometimes referred to as the "first instance" of the app) and the device is referred to as the "first device." The device, which may be any device capable of executing an application, is connected to a home/local network.

At block 204, the first device discovers a compatible device/platform on the network. This discovery may be done using conventional and suitable protocols such as UPnP, Bon Jour, and the like. A device or platform is compatible if it can execute a companion app to the primary app. At block 206, it is determined whether such a device has been discovered on the network.

If such a device (the "second device"), such as a TV or tablet, is found on the network, control goes to block 208 where the first device queries the second device whether the second device presently has a companion or compatible app (with respect to the primary app on the first device). The second device has a software stack that can handle this type of query or request. The query is sent using a communication protocol as defined or chosen by the developer. It may be a proprietary communication protocol. If no compatible device is found on the network, the discovery process continues in the background and control goes back to block 204.

At block 210, the first device is informed of whether a companion app is already installed on the second device. If a companion app is already on the second device, control goes to block 212. If the companion app is not installed, control goes to block 220 of FIG. 2B. If the app is installed, at block 212 it is determined whether the companion app is presently running on the second device. If it is, the user is already having an enhanced 2-screen, convergence experience with the app and the process ends. If it is not, at block 214, the primary app displays a message on the first device asking the user if he wants to execute the companion app on the second device, such a display is shown in display 104a of FIG. 1. The code or logic to display this message may be embedded in the primary app presently executing on the first device.

At block 216, the first device determines whether the user accepts the offer (i.e., gives permission to execute the companion app on the second device). If the user does not, the process ends. If the user accepts the offer, a message is sent to the second device and the companion app executes at which stage the process ends. Returning to the path where the companion app is already installed on the second device, the user can begin experiencing app and device convergence on two devices.

Going back to block 210, if the companion app is not installed on the second device, control goes to block 220 in FIG. 2B. At this step the user is prompted as to whether he wants to install a compatible or companion app on the second device, as shown in screen display 108a of FIG. 1. Part of the process here may also involve checking whether the companion app is available for downloading from a server on the network or from an online source for apps, commonly known as an application store. At block 219, the device checks whether the last user selection for the app was to not install (e.g., "Do Not Install"). If so, control goes back to discovery at block 204. If it was not the last selection by the user, control goes to block 220. Here, assuming the app is available, the user of the first device is prompted about installing it as shown in block 220. At block 222, it is determined whether the user consents to installing the companion app on the second device. If the user does consent or give permission to have the companion app downloaded onto the second device, control goes to block 224 where a request is created and transmitted to the second device using the communication means described above. The request instructs the second device to initialize downloading of the companion app. At this stage the companion app is downloaded onto the second device as shown in displays 110a and 110b. In this manner, a device in the local network, such as a TV, downloads a specific app according to instructions sent from another device in the network. In one embodiment, control then goes to block 214 of FIG. 2A. Here the user is asked whether to execute the downloaded app.

At block 222, if the user does not consent to downloading the app, control goes to block 226 where a "do not install" setting is saved as the last user selection. This setting may be checked prior to block 220 where the user is prompted to install the companion app. If this setting indicates that the user previously selected the "do not install" option, he is not prompted again on the same question. The process then loops back to block 204 where the discovery process continues. For example, although the user may not want to install the app on the TV, a tablet may now be discoverable on the network and the same process executing in the background on the primary device will occur for this or any new devices. In this case, the user may want to install the companion app on the tablet.

Figure 3:
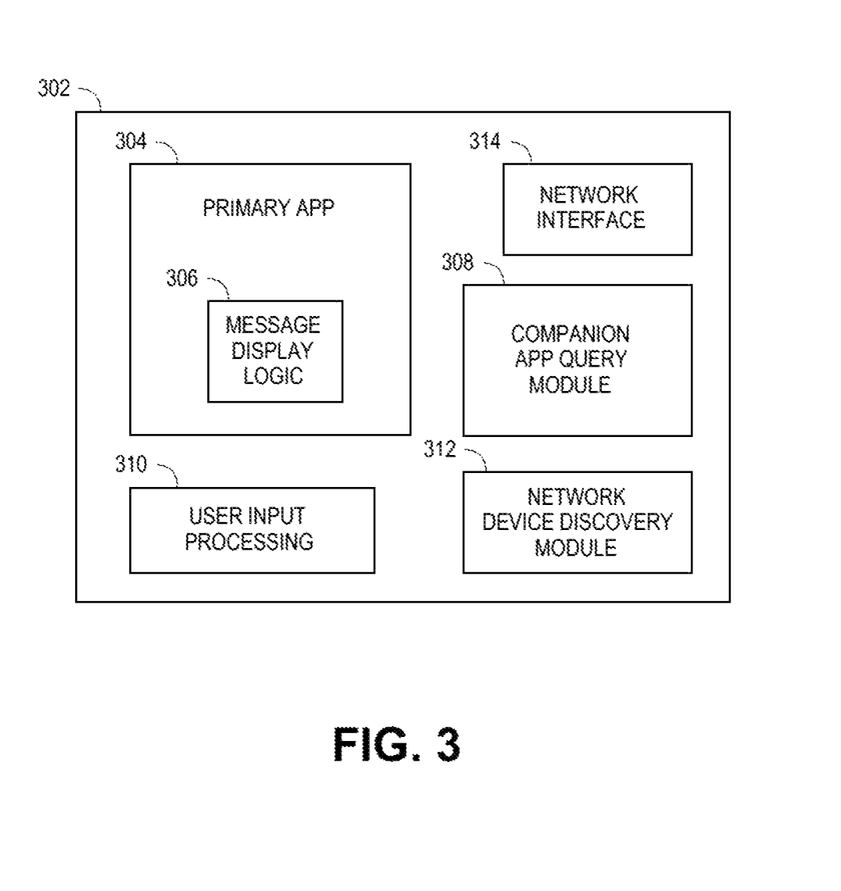
FIG. 3 is a block diagram showing relevant components and modules in a first device in accordance with one embodiment of the present invention.

FIG. 3 is a block diagram showing relevant components and modules in a first device, such as a smartphone, in accordance with one embodiment of the present invention. A first device 302 has a primary app 304 as described above. In one or more embodiments, primary app 304 may contain logic for displaying messages on the first device, such as "Execute Companion App on TV?" or "Executing Netflix App on TV . . . " and the like. The user may provide input to queries by primary app 304 or other modules in device 302. These inputs may be processed by user input processing module 310. As described above, queries are also made of the second device, such as a TV, for example, to determine whether a companion app exists on the second device, if it does, whether it is executing, and so on. This may be done by logic in a companion app query module 308. First device 302 starts the process of finding a second device and companion app by initiating a discovery process on a local network using a suitable protocol such as UPnP or Bon Jour. This may be performed by network device discovery module 312 or other conventional modules for implementing such protocols. There may also be a network interface component 314 for communicating on the local network.

Through the processes described above, an application running on one class of devices (e.g., smartphone, tablet, or devices having the same operating system or platform) has awareness of a companion application for a second class of devices (e.g., a TV). A device from the first class realizes or becomes aware of the presence of a device from the second class on the same local network and the first device coordinates the download and installation of the companion app enabling communication of the two apps and providing a convergence experience for the user. Described below are variations of the above embodiments and alternative embodiments. Some of the description may repeat certain aspects of the content in FIGS. 1, 2A, and 2B but is provided to support the various illustrations.

In one embodiment, the ability of one instance of an application on a first device to verify an installation of a companion or second instance of the application on a second device is described. Also described is the ability of the first instance on the first device to initiate a download of the companion application on a second device. The first and second devices may be any suitable computing device such as smartphones, tablets, TVs, mobile or stationary gaming devices, and PCs. For example, in one example the process may begin with a first device, such as a tablet, running a first instance of an app. The first device is connected to a local/home network and, in the background, discovers that there is a compatible or suitable second device on the network, such as a TV or PC, and communicates with the second device to exchange data or commands, such as commands relating to a discovery protocol (e.g., UPnP) which allows the first device to discover the second device and find its capabilities, including what apps are installed. The first device then sends a request to the second device to determine whether the second device has a companion or second instance of the (first instance) app running on the first device.

The second device sends a response to the request to the first device, i.e., whether the second device as the companion app installed or whether the server has it available for download. If the second device does not have the companion app and the server has it available for download, the first instance of the app on the first device displays a message or notification to the user. The notification indicates that a companion app is available for the second device and, in the same notification, asks whether the user wants to have the companion app downloaded to the second device from the server or other source.

If the user gives permission or approval to download the companion app, the first device issues a command to the second device to download the companion app from the server. The second device then initiates a download of the companion app after which the second device has the companion app. The first instance of the app initiates the download of a companion instance of the app onto a separate device where all the processes, except seeking permission from the user, execute in the background. The user does not need to explicitly connect to and browse an app store or app market. The mechanism for executing the processes described above can be embedded in any app in order to promote use of a companion app for a second device.

In this manner, app vendors encourage users to install companion apps onto more devices, for which consumers may not have been aware that apps were available. This is most often the case with apps for TVs. As a result of the embodiments described herein, the second device, such as the TV, is likely used more often as an app device. The user is more aware and is more inclined to use convergence apps and have a better user experience with the apps.

To illustrate an embodiment, one device is a smartphone and the other device is a TV. The smartphone is the device being used by a user and has a primary app (also referred to as a client app) that is executing on the smartphone and the TV, in this illustration, already has an app that is a companion app to the primary app on the smartphone. It should be noted that the same relationship can be seen in the other direction, that is, the user is watching TV or the user is using (running) an app on the TV and the TV has the primary app and the smartphone already has a companion app to the primary app on the TV.

Returning to the illustration, the smartphone is running the primary app, and is on the same network as the TV. It discovers that there is a compatible TV in the same network. Here compatible implies it is on the same network and is able to execute apps. The smartphone then "pairs" with the TV. If there are other compatible devices, such as other smartphones or PCs, the smartphone carries out the same process with the other devices. The smartphone then checks via the network whether the TV has a companion app to the app executing on the smartphone. If the TV has a companion app, this fact is transmitted to the smartphone, again via the local network. The primary app on the smartphone then displays a message to the user telling the user that there is a companion app on the TV and asks whether the user wants to launch the companion app. If the user gives approval, the smartphone issues a command to the TV via network protocol (which may be proprietary) to launch the companion app on the TV. The TV launches the companion app. The primary app on the smartphone then communicates with the companion app to provide an enhanced, multi-screen user experience with respect to the app.

As described above, an embodiment of the invention introduces a new mechanism for an app on a first device to discover and launch a companion app on a second device. This may be described as a peer-to-peer communication over a home/local network as described in FIGS. 2A and 2B. It is different from conventional home networking standards because an embodiment of the invention provides a mechanism for proprietary communication between the app on the first device and the companion app on the second device over standard HTTP/HTTPS, UPnP, or other conventional protocols. This mechanism, shown in blocks 204 to 224, is a direct communication mechanism between two devices over the home network, typically a wireless access point, router, or at least a network switch may be involved. Alternatively, the first and second devices could communicate over Bluetooth or Wi-Fi Direct standards which do not require any network infrastructure device. These standard technologies are used to discover and connect to other devices in the home/local network. As a result, embodiments of the present invention can support any device type and are not tied to a specific operating system, platform, or product. The developer can define their own proprietary communication protocol over this standard channel (e.g., using customized JSON, XML messages, and the like).

An embodiment of the present invention introduces a way to identify a second device on the network and have a first device automatically ask the second device whether it has a companion app. The only interaction or communication with the user of the first device that may be needed is a message asking whether the user wants to download or execute a companion app on the second device in order to have a multi-screen app experience. In other embodiments, this is not needed.

The various embodiments enable a primary app on a first device to identify and discover a second device in the network and a compatible/companion app. This identifying and discovering is done in the background while the first device is on and connected to the network. The user of the first device is given the option of downloading and/or launching the companion app on the second device. In this manner, the user enjoys a rich, immersive app experience on multiple devices.

Figure 4A:
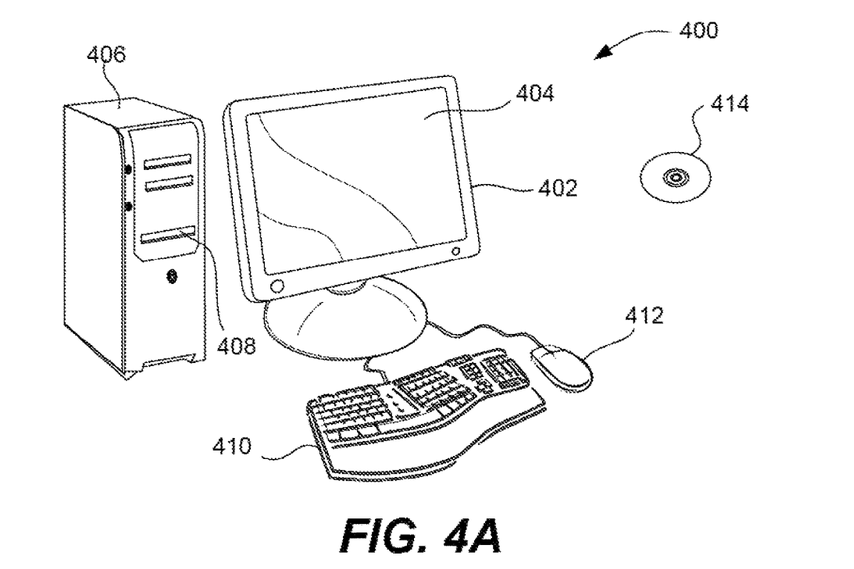
FIGS. 4A and 4B are diagrams of a computing device suitable for implementing one or more embodiments of the present invention.
Figure 4B:
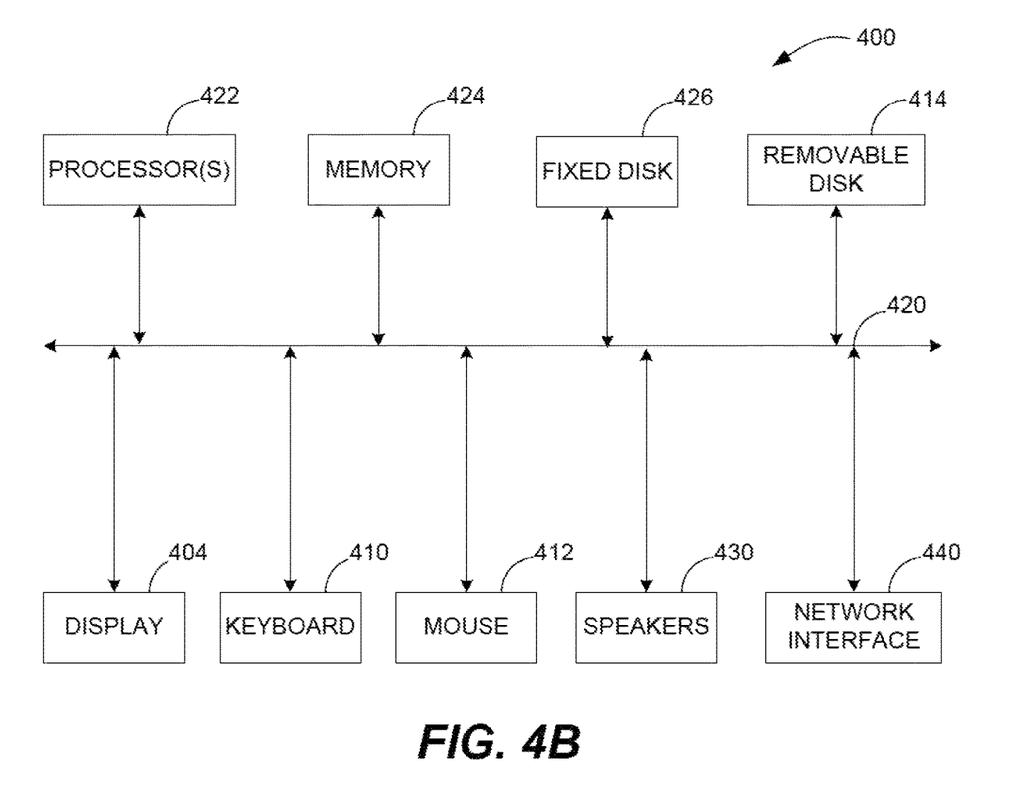

As noted above, the primary computing device in an embodiment of the invention is a TV, but it may be another computing device such as a smart phone, a tablet computer, a mobile device, a PC, and the like. FIGS. 4A and 4B illustrate a generic computing system 400, such as a TV, suitable for implementing embodiments of the present invention. Some of the devices that can be used in the present invention may have other features or components (such as an internal TV turner or an external STB) that are not shown in FIGS. 4A and 4B and not all the components shown in these figures (e.g., the keyboard) are needed for implementing the present invention. As such, FIG. 4A shows one possible physical implementation of a computing system as this term is broadly defined.

In one embodiment, system 400 includes a display or screen 404. This display may be in the same housing as system 400. It may also have a keyboard 410 that is shown on display 404 (i.e., a virtual keyboard) or may be a physical component that is part of the device housing. It may have various ports such as HDMI or USB ports (not shown). Computer-readable media that may be coupled to device 400 may include USB memory devices and various types of memory chips, sticks, and cards.

FIG. 4B is an example of a block diagram for computing system 400. Attached to system bus 420 is a variety of subsystems. Processor(s) 422 are coupled to storage devices including memory 424. Memory 424 may include random access memory (RAM) and read-only memory (ROM). As is well known in the art, ROM acts to transfer data and instructions uni-directionally to the CPU and RAM are used typically to transfer data and instructions in a bi-directional manner. Both of these types of memories may include any suitable of the computer-readable media described below. A fixed disk 426 is also coupled bi-directionally to processor 422; it provides additional data storage capacity and may also include any of the computer-readable media described below. Fixed disk 426 may be used to store programs, data and the like and is typically a secondary storage medium that is slower than primary storage. It will be appreciated that the information retained within fixed disk 426, may, in appropriate cases, be incorporated in standard fashion as virtual memory in memory 424.

Processor 422 is also coupled to a variety of input/output devices such as display 404 and network interface 440. In general, an input/output device may be any of: video displays, keyboards, microphones, touch-sensitive displays, tablets, styluses, voice or handwriting recognizers, biometrics readers, or other devices. Processor 422 optionally may be coupled to another computer or telecommunications network using network interface 440. With such a network interface, it is contemplated that the CPU might receive information from the network, or might output information to the network in the course of performing the above-described method steps. Furthermore, one or more method embodiments of the present invention may execute solely upon processor 422 or may execute over a network such as the Internet in conjunction with a remote processor that shares a portion of the processing.

In addition, one or more embodiments of the present invention further relate to computer storage products with a computer-readable medium that have computer code thereon for performing various computer-implemented operations. The media and computer code may be those specially designed and constructed for the purposes of one or more embodiments of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

The invention claimed is:

1. A non-transitory computer-readable medium that includes a program that when executed by a computer performs a method comprising:
   launching a first instance of an app on a first device;
   initiating a discovery process that comprises discovering, by the first instance of the app, a second device that can execute a second instance of the app on a different platform than the first device, wherein the discovering is performed in the background without user interaction, the second device is located on a same network as the first device, and content is displayed on the second device;
   querying, by the first instance of the app, the second device on whether the second instance of the app is installed on the second device, wherein the querying is performed in the background without user interaction;
   if the second instance of the app is installed on the second device, displaying, by the first instance of the app, a first message on the first device offering to execute the second instance of the app on the second device; and
   if the second instance of the app is not installed on the second device:
      determining, by the first instance of the app, whether a first setting representing a previous user selection not to install the second instance of the app on the second device is saved;
      if the first setting is not saved, displaying, by the first instance of the app, a second message on the first device prompting a user of the first device on whether the user wants to install the second instance of the app on the second device; and
      if the first setting is saved, continuing the discovery process to discover, by the first instance of the app, a third device that can execute the second instance of the app, wherein the third device is located on the same network as the first device and is different from the second device.

2. The non-transitory computer-readable medium of claim 1, wherein the method further comprises:
   if the user provides permission to install the second instance of the app on the second device in response to the second message:
      initiating, by the first instance of the app, a download of the second instance of the app to the second device by causing a server to perform the download of the second instance of the app to the second device, without requiring the user to locate the second instance of the app in an app store, wherein the content continues to be displayed on the second device during the initiating the download of the second instance of the app;
      receiving, from the first instance of the app, an execution command for the second instance of the app in response to verification that the second instance of the app is installed on the second device; and
      causing, by the first instance of the app, the second instance of the app to execute on the second device based on the execution command, wherein a communication protocol over a network protocol provides for communication between the first instance of the app and the second instance of the app for providing a multi-screen interface for app convergence on the first device and the second device.

3. The non-transitory computer-readable medium of claim 1, wherein the method further comprises:
   if the user does not provide permission to install the second instance of the app on the second device in response to the second message, saving the first setting.

4. The non-transitory computer-readable medium of claim 1, wherein the network protocol comprises a hypertext transfer protocol (HTTP), a HTTPS (secure HTTP), or a universal plug and play (UPnP) protocol, and the first device and the second device exchange communications comprising an exchange of data or commands.

5. The non-transitory computer-readable medium of claim 1, wherein the first instance of the app works with the second instance of the app to provide the multi-screen interface, and the different platform comprises a layer above an operating system of the second device that comprises both a runtime environment for generic programming instructions, and application programming interfaces specific to at least one of functions, services and devices of the second device.

6. The non-transitory computer-readable medium of claim 2, wherein the method further comprises:
   if the user accepts the offer to execute the second instance of the app on the second device in response to the first message:
      causing display of a notification on the first device that the second instance of the app will execute; and
   if the user provides permission to install the second instance of the app on the second device in response to the second message:
      causing display of a notification on the first device that downloading is in progress.

7. The non-transitory computer-readable medium of claim 2, wherein the first instance of the app on the first device is configured to receive input from the user utilizing the first device, and the input comprises one of user permission to download the second instance of the app to the second device or user permission to execute the second instance of the app on the second device.

8. The non-transitory computer-readable medium of claim 2, wherein a different message indicating launching of the second instance of the app on the second device and the content are simultaneously displayed on the second device during the launching of the second instance of the app on the second device in response to the first instance of the app causing the second instance of the app to execute on the second device based on the execution command, and the different message identifies a name of the user who gave user permission, via the first instance of the app, to execute the second instance of the app on the second device.

9. The non-transitory computer-readable medium of claim 1, wherein the method further comprises:
pairing the second device with the first device for peer-to-peer communication over a network.

10. The non-transitory computer-readable medium of claim 2, wherein the app convergence on a display screen of the first device and a display screen of the second device is provided based on the communication via the communication protocol and execution of both the first instance of the app and the second instance of the app, the second device is a television device, the first device is one of a smart phone device or a tablet device, a different message indicating launching of the second instance of the app on the second device and the content are simultaneously displayed on the second device during the launching of the second instance of the app on the second device in response to the first instance of the app causing the second instance of the app to execute on the second device based on the execution command, and the different message identifies a name of the user who gave user permission, via the first instance of the app, to execute the second instance of the app on the second device.

11. A non-transitory computer-readable medium that includes a program that when executed by a computer performs a method comprising:
initiating a discovery process that comprises discovering, by a first instance of an app on a first device, a second device that can execute a second instance of the app on a different platform than the first device, wherein the discovering is performed in the background without user interaction, the second device is located on a same network as the first device, and content is displayed on the second device;
querying, by the first instance of the app, the second device on whether the second instance of the app is installed on the second device, wherein the querying is performed in the background without user interaction;
if the second instance of the app is installed on the second device, displaying, by the first instance of the app, a first message on the first device offering to execute the second instance of the app on the second device; and
if the second instance of the app is not installed on the second device:
determining, by the first instance of the app, whether a first setting representing a previous user selection not to install the second instance of the app on the second device is saved;
if the first setting is not saved, displaying, by the first instance of the app, a second message on the first device prompting a user of the first device on whether the user wants to install the second instance of the app on the second device; and
if the first setting is saved, continuing the discovery process to discover, by the first instance of the app, a third device that can execute the second instance of the app, wherein the third device is located on the same network as the first device and is different from the second device.

12. The non-transitory computer-readable medium of claim 11, wherein the method further comprises:
pairing the second device with the first device for peer-to-peer communication over a network.

13. The non-transitory computer-readable medium of claim 11, wherein the method further comprises:
if the user does not provide permission to install the second instance of the app on the second device in response to the second message, saving the first setting.

14. The non-transitory computer-readable medium of claim 11, wherein the method further comprises:
if the user provides permission to install the second instance of the app on the second device in response to the second message:
initiating, by the first instance of the app, a download of the second instance of the app to the second device by causing a server to perform the download of the second instance of the app to the second device, without requiring the user to locate the second instance of the app in an app store, wherein the content continues to be displayed on the second device during the initiating the download of the second instance of the app;
receiving, from the first instance of the app, an execution command for the second instance of the app in response to verification that the second instance of the app is installed on the second device; and
causing, by the first instance of the app, the second instance of the app to execute on the second device based on the execution command, wherein a communication protocol over a network protocol provides for communication between the first instance of the app and the second instance of the app for providing a multi-screen interface for app convergence on the first device and the second device.

15. The non-transitory computer-readable medium of claim 11, wherein the network is a local network, the network protocol comprises a hypertext transfer protocol (HTTP), a secure HTTP (HTTPS), or a universal plug and play (UPnP) protocol standard, the network protocol is used to query the first device, the communication protocol provides for the communication between the first instance of the app and the second instance of the app, and the first device and the second device exchange communications comprising an exchange of data or commands.

16. The non-transitory computer-readable medium of claim 14, wherein the method further comprises:
if the user accepts the offer to execute the second instance of the app on the second device in response to the first message:
causing display of a notification on the first device that the second instance of the app will execute; and
if the user provides permission to install the second instance of the app on the second device in response to the second message:
causing display of a notification on the first device that downloading is in progress.

17. The non-transitory computer-readable medium of claim 14, wherein a different message indicating launching of the second instance of the app on the second device and the content are simultaneously displayed on the second device during the launching of the second instance of the app on the second device in response to the first instance of the app causing the second instance of the app to execute on the second device based on the execution command, and the different message identifies a name of the user who gave user permission, via the first instance of the app, to execute the second instance of the app on the second device.

18. The non-transitory computer-readable medium of claim 14, wherein the method further comprises:
determining a location from where to download the second instance of the app.

19. The non-transitory computer-readable medium of claim 14, wherein the first instance of the app on the first device is configured to receive input from the user utilizing the first device, and the input comprises one of user permission to download the second instance of the app to the second device or user permission to execute the second instance of the app on the second device.

20. An apparatus comprising:
  a first device including a processor;
  a first instance of an app configured to use the processor to:
    initiate a discovery process that comprises discovering a second device that can execute a second instance of the app on a different platform than the first device, wherein the discovering is performed in the background without user interaction, the second device is located on a same network as the first device, and content is displayed on the second device;
    query the second device on whether the second instance of the app is installed on the second device;
    if the second instance of the app is installed on the second device, display a first message on the first device offering to execute the second instance of the app on the second device; and
    if the second instance of the app is not installed on the second device:
      determine whether a first setting representing a previous user selection not to install the second instance of the app on the second device is saved;
      if the first setting is not saved, display a second message on the first device prompting a user of the first device on whether the user wants to install the second instance of the app on the second device; and
      if the first setting is saved, continue the discovery process to discover a third device that can execute the second instance of the app, wherein the third device is located on the same network as the first device and is different from the second device;
  message display logic configured to use the processor to display messages on the first device relating to the first instance of the app and the second instance of the app;
  a query interface configured to create queries communicated from the first instance of the app and for the second instance of the app, wherein the queries are created and communicated in the background without user interaction; and
  an input processing interface configured to use the processor to process input relating to the first instance of the app and the second instance of the app.

21. The apparatus of claim 20, wherein the first instance of the app is further configured to use the processor to:
  if the user provides permission to install the second instance of the app on the second device in response to the second message:
    initiate a download of the second instance of the app to the second device by causing a server to perform the download of the second instance of the app to the second device, without requiring the user to locate the second instance of the app in an app store, wherein the content continues to be displayed on the second device during the initiating the download of the second instance of the app;
    receive an execution command for the second instance of the app in response to verification that the second instance of the app is installed on the second device; and
    cause the second instance of the app to execute on the second device based on the execution command, wherein a communication protocol over a network protocol provides for communication between the first instance of the app and the second instance of the app for providing a multi-screen interface for app convergence on the first device and the second device.

22. The apparatus of claim 21, wherein the query interface is configured to create one or more communications from the first instance of the app including a first communication to determine whether the second instance of the app exists on the second device, a second communication to determine whether the second instance of the app is presently executing on the second device, and a third communication to initiate the download of the second instance of the app onto the second device.

23. The apparatus of claim 20, further comprising:
  a network device discovery interface configured to discover the second device on a local network via the network protocol, wherein the network protocol comprises one of a hypertext transfer protocol (HTTP), a secure HTTP (HTTPS), or a universal plug and play (UPnP) protocol, and the first device and the second device have direct communication between one another over the local network using the network protocol.

* * * * *